(12) United States Patent
Kwon et al.

(10) Patent No.: US 9,221,507 B2
(45) Date of Patent: Dec. 29, 2015

(54) ROBOT AND METHOD OF CONTROLLING WALKING THEREOF

(75) Inventors: Woong Kwon, Seongnam-si (KR); Joong Kyung Park, Suweon-si (KR); Chang Hyun Roh, Seoul (KR); Jae Ho Park, Suwon-si (KR); Ho Seong Kwak, Cheonan-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1332 days.

(21) Appl. No.: 12/427,009

(22) Filed: Apr. 21, 2009

(65) Prior Publication Data
US 2009/0319082 A1 Dec. 24, 2009

(30) Foreign Application Priority Data
Jun. 19, 2008 (KR) .................. 10-2008-0057699

(51) Int. Cl.
*B62D 57/032* (2006.01)

(52) U.S. Cl.
CPC .................. *B62D 57/032* (2013.01)

(58) Field of Classification Search
CPC ...... B62D 57/032; B62D 57/00; B62D 57/02; B62D 57/022; B62D 57/024; B25J 9/0003; B25J 9/0006; B25J 9/1669
USPC .......... 700/245, 253, 254, 258, 260, 261, 250
See application file for complete search history.

(56) References Cited

U.S. PATENT DOCUMENTS

| 4,834,200 | A | * | 5/1989 | Kajita | 180/8.1 |
| 5,151,859 | A | * | 9/1992 | Yoshino et al. | 701/23 |
| 5,221,883 | A | * | 6/1993 | Takenaka et al. | 318/568.12 |
| 5,426,586 | A | * | 6/1995 | Ozawa | 701/23 |
| 6,301,524 | B1 | * | 10/2001 | Takenaka | 700/245 |
| 7,663,332 | B2 | * | 2/2010 | Fukuda et al. | 318/568.12 |
| 2003/0120388 | A1 | * | 6/2003 | Kuroki et al. | 700/245 |

FOREIGN PATENT DOCUMENTS

| JP | 2002346957 | 12/2002 |
| JP | 2005-115654 | 4/2005 |
| JP | 2009-512563 | 3/2009 |

(Continued)

OTHER PUBLICATIONS

Erbatur et al.; Biped Robot Reference Generation with Natural ZMP Trajectories; Proceedings of the 9th IEEE International Workshop on Advanced Motion Control; 2006; pp. 403-410.*

(Continued)

*Primary Examiner* — Stephen Holwerda
(74) *Attorney, Agent, or Firm* — Harness, Dickey & Pierce, P.L.C.

(57) ABSTRACT

A method of controlling walking a biped robot to generate a walking pattern maximally similar to that of a human includes generating a walking pattern, calculating a walking pattern similarity corresponding to the walking pattern, and comparing the walking pattern similarity with a predetermined reference pattern similarity, and changing the walking pattern based on a result of the comparison. When the robot walks, a knee is maximally stretched and a horizontal movement of a waist is minimized such that the walking pattern of the robot is maximally similar to that of a human, thus enhancing an affinity for a human being and increasing energy efficiency.

14 Claims, 7 Drawing Sheets

(56) References Cited

FOREIGN PATENT DOCUMENTS

| KR | 10-0709556 | 4/2007 |
| KR | 1020070072314 | 7/2007 |
| KR | 10-0835354 | 6/2008 |
| WO | WO 2007046568 A1 * | 4/2007 |

OTHER PUBLICATIONS

Barr; Introduction to Closed-Loop Control; embedded.com; Jul. 31, 2002; pp. 1-8.*

Ogura et al.; Human-like Walking with Knee Stretched, Heel-contact and Toe-off Motion by a Humanoid Robot; Proceedings of the 2006 IEEE/RSJ International Conference on Intelligent Robots and Systems; 2006; pp. 3976-3981.*

Yu Ogura, Kazushi Shimonura, Hideki Kondo, Akitoshi Morishima, Tatsu Okubo, Shimpei Momoki, Hun-ok Lim and Atsuo Takanishi—Human-like Walking with Knee Stretched, Heel-contact and Toe-off Motion by a Humanoid Robot—1-4244-0259-X/06/IEEE—pp. 3976-3981.

Shuuji Kajita, Fumio Kanehiro, Kenji Kaneko, Kiyoshi Fujiwara, Kensuke Harada, kazuhito Yokoi and Hirohisa Hirukawa—Biped Walking Pattern Generation by using Preview Control of Zone-Moment Point—0-7803-7736-2/03/IEEE—pp. 1620-1626.

Qiang Huang, Jie Yang, Zhangguo Yu, Wei Xu, Jianxi Li and KeJie Li, Measurement of Human Walking and Generation of Humanoid Walking Pattern, Proc. of 2007 IEEE International Conference on Robotics and Biomimetics, pp. 127-132.

Qiang Huang, Zhaoqin Peng, Weimin Zhang, Lige Zhang an d KeJie Li, Design of Humanoid Complicated Dynamic Motion Based on Human Motion Capture, Proc. of 2005 IEEE/ RSJ International Conference on Intelligent Robots and Systems, IEEE 2005, pp. 686-691.

Woong Kwon, Hyun K. Kim, Joong Kyung Park, Chang Hyun Roh, Jawoo Lee, Jaeho Park, Won-Kuk Kim and Kyungshik Roh, Biped Humanoid Robot Mahru III, Proc. of 2007 7th IEEE-RAS International Conference on Humanoid Robots , IEEE, 2007, pp. 583-588.

Qiang Huang, Zhangguo Yu, Weimin Zhang, Zingguang Duan , Yuancan Huang and KeJie Li, Generation of Humanoid Walking Pattern Based on Human Walking Measurement, Proc of 2008. 8th IEEE-RAS International Conference on Humanoid Robots, IEEE 2008, pp. 99-104.

Sven Wehner and Maren Bennewitz, Optimizing the Gait of a Humanoid Robot Towards Human-like Walking, Proc. of the 4th European Conference on Mobile Robots, ECMR ' 09, 2009, pp. 277-282.

Sven Wehner and Maren Bennewitz, Humanoid Gait Optimization Based on Human Data, Automatika, 2011, 52 (3), pp. 223-232.

Office Action issued in JP Application No. 2009-080288 dated Apr. 2, 2013.

Korean Office Action dated Jun. 24, 2014 issued in KR Application No. 10-2008-0057699.

Notice of Patent Allowance dated Mar. 9, 2015 for corresponding application KR 10-2008-0057699.

* cited by examiner

ROBOT AND METHOD OF CONTROLLING WALKING THEREOF

CROSS-REFERENCE TO RELATED APPLICATIONS

This application claims priority under 35 U.S.C. §119(a) from Korean Patent Application No. 2008-0057699, filed Jun. 19, 2008, in the Korean Intellectual Property Office, the disclosure of which is incorporated herein in its entirety by reference.

BACKGROUND

1. Field

The present general inventive concept relates to a robot and a method of controlling walking thereof, and more particularly to a biped robot, which generates a stable walking pattern maximally similar to a stable walking pattern of a human, and a method of controlling walking of the robot.

2. Description of the Related Art

In general, machines, which conduct motion similar to that of a human using an electric or magnetic action, are referred to as robots. Initial robots were industrial robots, such as manipulators or transfer robots for the purpose of work automation and unmanned operation in production sites. Recently, a biped walking robot (hereinafter, referred to as a biped robot), which has a joint system similar to that of a human and easily walks with two feet in human work and living spaces, has been researched and developed.

Most biped robots have a walking pattern, in which the robot walks with knees bent and a waist moving only on a plane being parallel with the ground. In case that the knees are stretched to an angle close to 180°, a singularity pose where a relative distance connecting an ankle joint and a hip joint is equal to the length of a leg is generated, and thus a knee joint speed is excessively increased or a desired knee joint angle cannot be obtained. Further, the constraint condition of a zero moment point (hereinafter, referred to as ZMP) to obtain the walking pattern is that the center of gravity (hereinafter, referred to as COG) of a robot moves parallel with the ground. See S. Kajita et al., "Biped Walking Pattern Generation by using Preview Control of Zero-Moment Point", ICRA2003, pp. 1620-1626.

However, such a walking pattern, in which a waist moves from side to side while maintaining a regular height on a condition that knees are considerably bent, considerably differs from that of a human.

In order to overcome the above robot walking pattern and achieve human-like walking, Waseda University has introduced a method, in which the knees are stretched and the ankles are rotated differently from the typical humanoid walking pattern. See Y. Ogura et al., "Human-like Walking with Knee Stretched, Heel-contact and Toe-off Motion by a Humanoid Robot", IROS06, pp. 3976-3981. This method does not consider separate control for similarity to human-like walking but aims to stretch a knee angle intuitively, and thus differs from the walking pattern of a human still due to an improper point of time to stretch knees and the shaking of a waist. When a robot walks differently from the walking pattern of a human, the robot has a low affinity for a human being and a low energy efficiency. Thus, an obstacle to the spread of the biped robot in a robot and human coexistence environment exists.

SUMMARY

The present general inventive concept provides a biped robot, in which knees are maximally stretched and a movement of a waist is minimized while walking to generate a walking pattern maximally similar to that of a human, and a method of controlling walking of the robot.

Additional aspects and utilities of the present general inventive concept will be set forth in part in the description which follows and, in part, will be obvious from the description, or may be learned by practice of the general inventive concept.

In an embodiment and utilities of the present general inventive concept, there is provided a method of controlling walking of a robot, the method including generating a walking pattern, calculating a walking pattern similarity corresponding to the walking pattern, and comparing the walking pattern similarity with a predetermined reference pattern similarity, and changing the walking pattern based on a result of the comparison.

In the generation of the walking pattern, the walking pattern satisfying a zero moment point (ZMP) equation based on the center of gravity (COG) and the ZMP of the robot may be generated according to a walking instruction.

The walking pattern similarity may be a calculated value to define an extent of the similarity of the walking pattern of the robot to the walking pattern of a human.

The reference pattern similarity may be a reference value to define an extent of the similarity of the walking pattern of the robot to the walking pattern of a human.

In the change of the walking pattern, the walking pattern may be changed so that that the walking pattern similarity is increased by adjusting an angle of a knee of the robot, in case that the walking pattern similarity is not larger than the reference pattern similarity.

In change of the walking pattern, the walking pattern may be changed so that the knee is stretched by increasing or decreasing the angle of the knee of a leg located at a front, in case that the walking phase of the robot is a double support phase (DSP).

In the change of the walking pattern, the walking pattern may be changed so that the knee is stretched by increasing or decreasing the angle of the knee of a swing leg, in case that the walking phase of the robot is a single support phase (SSP).

In the change of the walking pattern, the walking pattern may be changed so that that the walking pattern similarity is increased by minimizing a movement of a waist of the robot, in case that the walking pattern similarity is not larger than the reference pattern similarity.

The method may further include controlling the walking of the robot according to the walking pattern, in case that the walking pattern similarity is larger than the reference pattern similarity.

In an embodiment and utilities of the present general inventive concept, there is also provided a robot comprising a walking pattern generating unit to generate a walking pattern, a walking pattern similarity calculating unit to calculate a walking pattern similarity corresponding to the walking pattern, and a control unit to compare the walking pattern similarity with a predetermined reference pattern similarity, to change the walking pattern when the walking pattern similarity is not larger than the reference pattern similarity, and to control the walking of the robot according to the walking pattern.

The control unit may compare a walking pattern similarity corresponding to the changed walking pattern with the reference pattern similarity, and determine whether the walking pattern is changed or the robot walks according to a result of the comparison.

The control unit may change the walking pattern so that that the walking pattern similarity is increased by adjusting an angle of a knee of the robot.

The control unit may change the walking pattern so that the knee is stretched by increasing or decreasing the angle of the knee of a leg located at the front, in case that the walking phase of the robot is a double support phase (DSP).

The control unit may change the walking pattern so that the knee is stretched by increasing or decreasing the angle of the knee of a swing leg, in case that the walking phase of the robot is a single support phase (SSP).

The control unit may change the walking pattern so that that the walking pattern similarity is increased by minimizing a movement of a waist of the robot, in case that the walking pattern similarity is not larger than the reference pattern similarity.

The foregoing and/or other aspects and utilities of the general inventive concept may also be achieved by providing a robot including a torso, a lower portion including a pair of upper links, lower links and knee joints to create a variable angle between the respective upper links and lower links, a waist disposed between the torso and the lower portion, and to provide a horizontal movement there between, and a walking pattern charging unit to generate a subsequent walking pattern differing from a previously generated walking pattern by increasing the variable angle of the knee joints and decreasing the horizontal movement of the waist.

The robot may further include a walking pattern generating unit to generate the previously generated walking pattern, a walking pattern similarity calculating unit to calculate a walking pattern similarity corresponding to the previously generated walking pattern, and a control unit to compare the walking pattern similarity with a predetermined reference pattern similarity, wherein the walking pattern charging unit generates the subsequent walking pattern in response to the walking pattern similarity not corresponding to the reference pattern similarity.

The foregoing and/or other aspects and utilities of the general inventive concept may also be achieved by providing a computer-readable recording medium having embodied thereon a computer program to execute a method, wherein the method including generating a walking pattern, calculating a walking pattern similarity corresponding to the walking pattern, and comparing the walking pattern similarity with a predetermined reference pattern similarity, and changing the walking pattern based on a result of the comparison.

BRIEF DESCRIPTION OF THE DRAWINGS

These and/or other aspects and utilities of the present general inventive concept will become apparent and more readily appreciated from the following description of the embodiments, taken in conjunction with the accompanying drawings in which.

DETAILED DESCRIPTION OF THE EMBODIMENTS

Reference will now be made in detail to embodiments of the present general inventive concept, an example of which is illustrated in the accompanying drawings, wherein like reference numerals refer to like elements throughout. The embodiments are described below to explain the present general inventive concept by referring to the annexed drawings.

Figure 1:
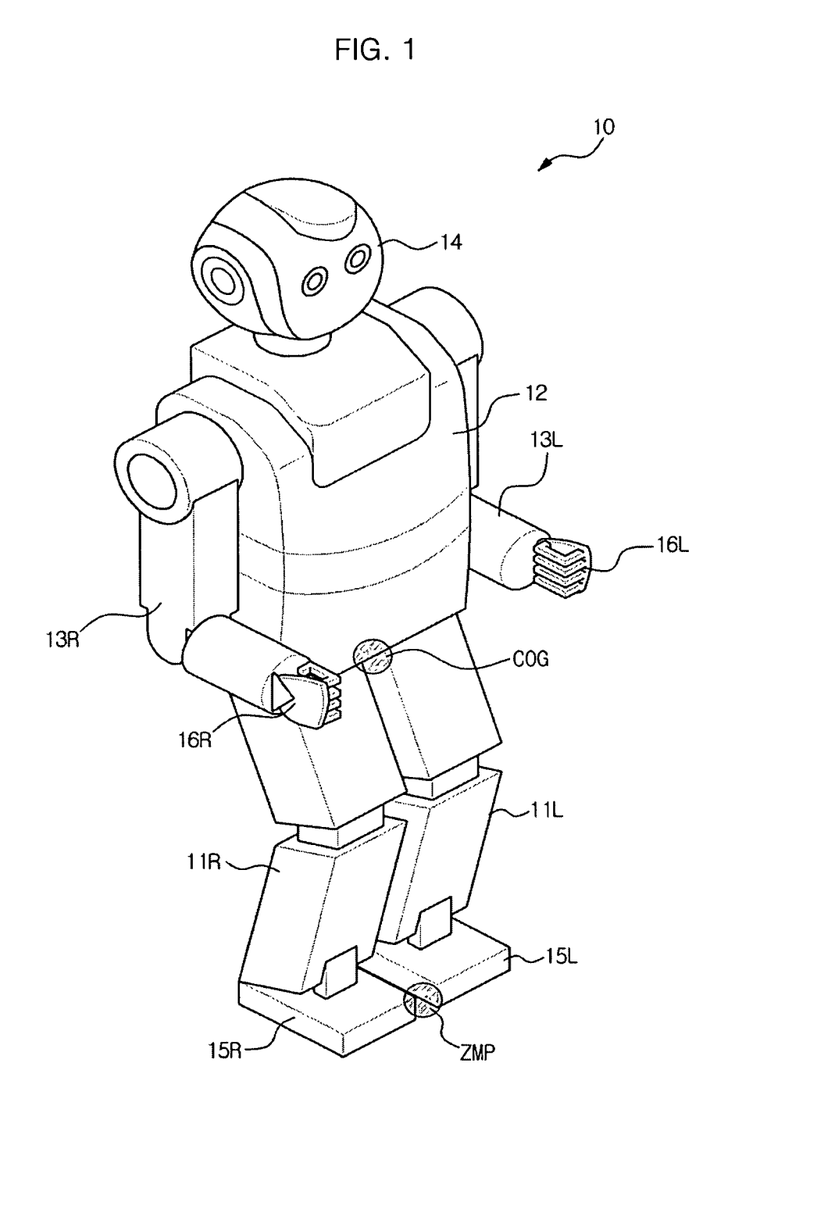
FIG. 1 is a schematic view illustrating an external appearance of a robot in accordance with an embodiment of the present general inventive concept.

FIG. 1 is a schematic view illustrating an external appearance of a robot in accordance with an embodiment of the present embodiment.

In FIG. 1, a robot 10 of the present general inventive concept is a biped walking robot, which walks erect using two legs 11R and 11L like a human, and includes a torso 12, two arms 13R and 13L and a head 14 provided at the upper portion of the torso 12, and feet 15R and 15L and hands 16R and 16L respectively provided at front ends of the two legs 11R and 11L and the two arms 13R and 13L. Here, R represents the right side, and L represents the left side, COG represents the center of gravity of the robot 10, and a zero moment point (ZMP) is a point where a total inertia force, i.e., a sum total of the moment in a roll direction (in the direction of the x-axis, i.e., a direction of the walking of the robot) and the moment in the pitch direction (in the direction of the y-axis, i.e., a direction of a step width of the robot) on a contact surface of the robot 10 with the ground, equals zero.

Figure 2:
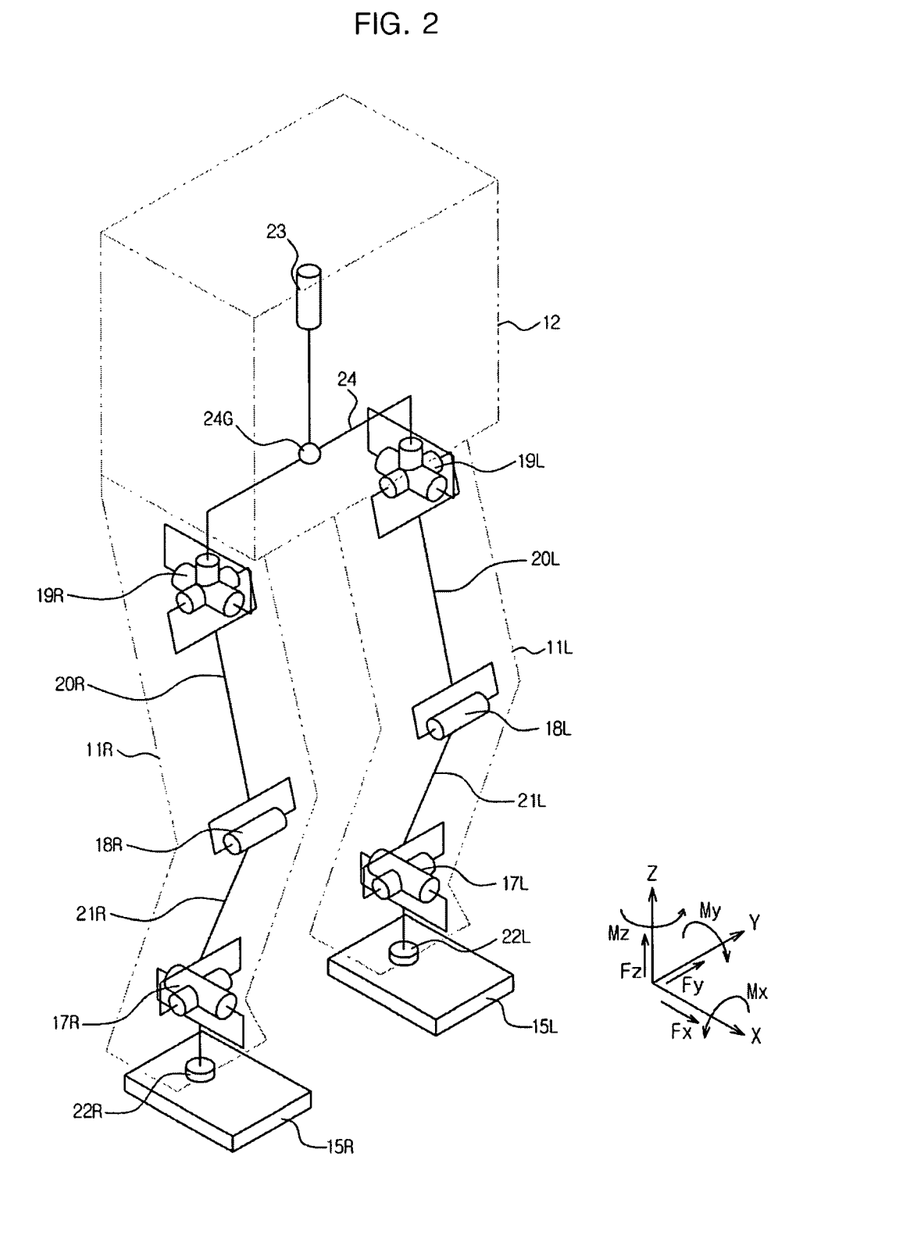
FIG. 2 is a view illustrating principal joint structures of the robot of FIG. 1.

FIG. 2 is a view illustrating principal joint structures of the robot of FIG. 1.

In FIG. 2, the two legs 11R and 11L respectively include ankle joints 17R and 17L, knee joints 18R and 18L, and hip joints 19R and 19L such that portions of the robot 10 corresponding to ankles, knees, and hips can rotate. The hip joints 19R and 19L are located at both side ends of a lower portion of the torso 12 connected to the two legs 11R and 11L.

The ankle joints 17R and 17L of the legs 11R and 11L can move in the directions of the x-axis (in the direction of a roll axis, i.e., the direction of the walking of the robot) and y-axis (in a direction of a pitch axis, i.e., the direction of the step width of the robot), the knee joints 18R and 18L can move in the direction of the y-axis (in the direction of the pitch axis), and the hip joints 19R and 19L can move in the directions of the x-axis, y-axis, and z-axis (in the direction of a yaw axis).

Further, the two legs 11R and 11L respectively include upper links 20R and 20L connecting the hip joints 19R and 19L and the knee joints 18R and 18L, and lower links 21R and 21L connecting the knee joints 18R and 18L and the ankle joints 17R and 17L, such that the robot 10 can walk with a designated level of a degree of freedom according to the movement of the respective joints 17R and 17L, 18R and 18L, and 19R and 19L. Force and torque sensors (hereinafter, referred to as F/T sensors) 22R and 22L, which are respectively disposed on ankles of the legs 11R and 11L, measure three direction components (Mx, My, Mz) of a moment and three direction components (Fx, Fy, Fz) of a force transmitted from the feet 15R and 15L, and thus provide ZMP data.

The torso 12 connected with the two legs 11R and 11L includes a waist joint 23 such that a portion of the robot 10 corresponding to a waist can rotate. The waist joint 23 is located coaxially with a central position 24G of a hip link 24 connecting the hip joints 19R and 19L located at both side ends of the lower portion of the torso 12.

Although not illustrated in the drawings, each of all the joints 17R and 17L, 18R and 18L, 19R and 19L, and 23 of the robot 10 includes an actuator for an operation thereof (for example, an electric driving device, such as a motor).

Figure 3:
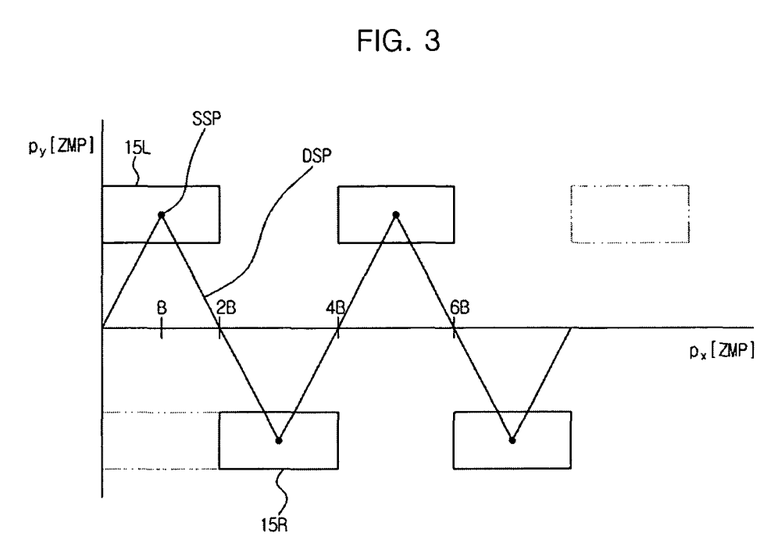
FIG. 3 is a view illustrating a ZMP trajectory of the robot in accordance with an embodiment of the present general inventive concept.
Figure 4:
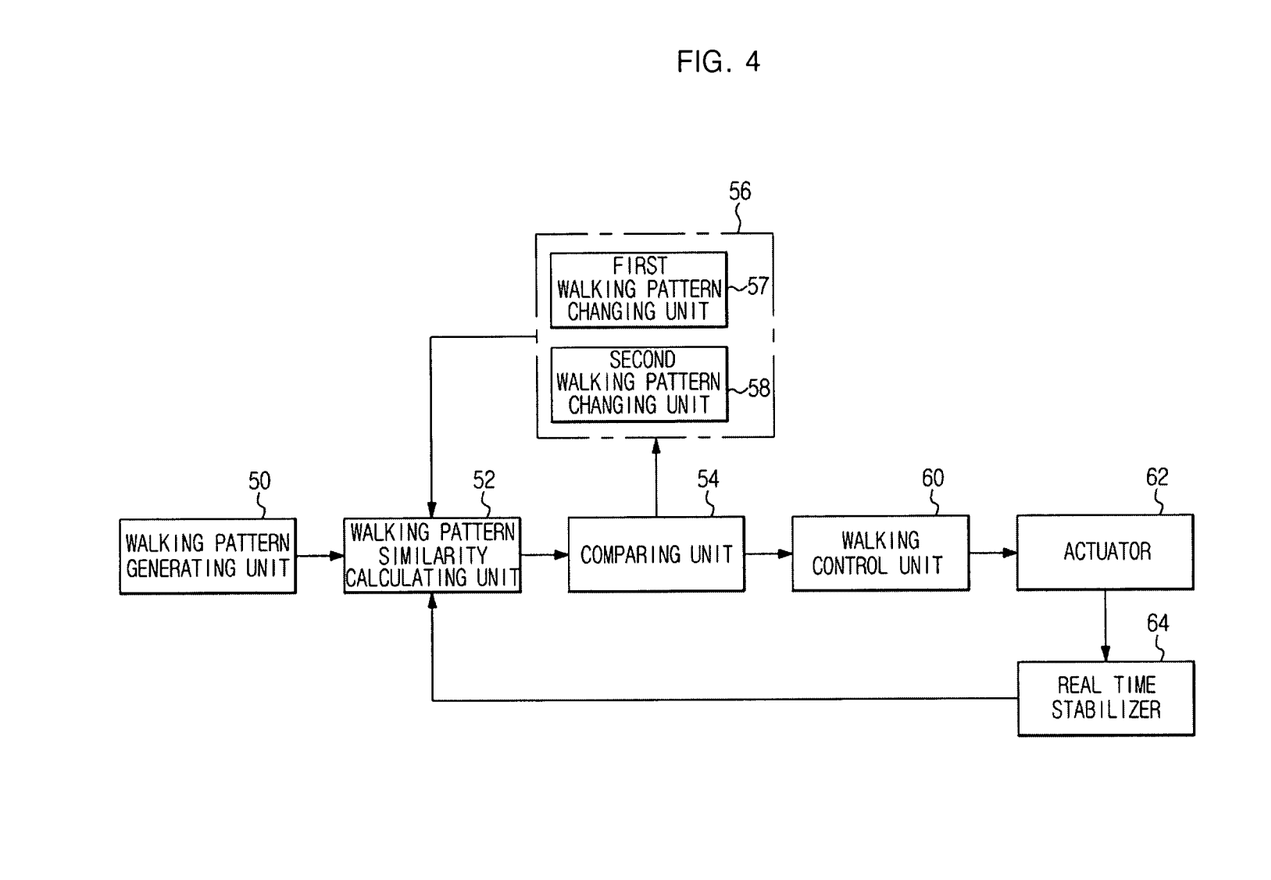
FIG. 4 is a walking control block diagram of the robot in accordance with an embodiment of the present general inventive concept.

FIG. 3 is a view illustrating a target ZMP trajectory of the robot in accordance with an embodiment of the present general inventive concept. That is, FIG. 4 illustrates the target ZMP trajectory of the robot 10 in the directions of the x-axis and the y-axis, represented on an x-y plane.

In FIG. 3, B represents a half of the step width.

Referring to FIGS. 1 and 3, in order to allow the robot 10 to achieve a stable walking pattern, a point wherein the sum total of moments equals zero, i.e., points where both feet make a step, must be predetermined, and the target ZMP trajectory to predetermine support phases, such as a single support phase (hereinafter, referred to as a SSP) and a double support phase (hereinafter, referred to as a DSP), must be set.

The points where the feet of the robot 10 make a step are generally expressed by a periodic function, and the support phases are used to move the ZMP. In the SSP, the ZMP must remain in a sole of the foot of a supporting leg while a swing leg makes a step. In the DSP, the ZMP must be rapidly moved from an inside of the sole of the foot of the supporting leg to an inside of a sole of the foot of the swing leg. In order to allow the robot 10 to continuously and stably walk, the above process is repeated.

FIG. 4 is a walking control block diagram of the robot in accordance with an embodiment of the present general inventive concept. Referring to FIGS. 1 and 4, the robot 10 includes a walking pattern generating unit 50, a walking pattern similarity calculating unit 52, a comparing unit 54, a walking pattern changing unit 56, a walking control unit 60, actuators 62, and a real time stabilizer 64.

The walking pattern generating unit 50 generates a walking pattern according to a given walking instruction, when the walking instruction, such as a target walking speed, a number of steps, or a step width, is given.

More specifically, when the walking instruction, such as a target walking speed, a number of steps, or a step width, is given, a pattern of the COG satisfying a ZMP equation between the COG and the ZMP is obtained so as to determine target positions and directions of both feet 15R and 15L and prepare positions and direction trajectories of both feet 15R and 15L according to time based on the determined target positions and directions.

The ZMP and the COG have a relation, as illustrated in Expression 1 below, by a kinetic equation, and Expression 1 is referred to as a ZMP equation.

$$\ddot{y} = \frac{g}{z_c}(y - p_y)$$
$$\ddot{x} = \frac{g}{z_c}(x - p_x)$$

[Expression 1]

Here, x and y represent COG patterns in a direction of the walking of the robot 10 (in the direction of the x-axis) and in a direction of the step width of the robot 10 (in the direction of the y-axis), $p_x$ and $p_y$ represent ZMP trajectories in the direction of the walking of the robot 10 (in the direction of the x-axis) and in the direction of the step width of the robot 10 (in the direction of the y-axis), $Z_c$ represents a height of the COG of a constraint plane, and g represents an acceleration of gravity.

Walking control based on ZMP is a method of generating a walking pattern satisfying the ZMP equation while controlling a pose of the robot 10 such that the ZMP is maintained in a support polygon of the robot 10, using a principle that the robot 10 does not fall down in case that the ZMP is located in a polygonal surface of the robot 10.

The walking pattern similarity calculating unit 52 calculates a walking pattern similarity to determine to what extent the walking pattern generated by the walking pattern generating unit 50 is similar to the walking pattern of a human using a human-like walking similarity measure (hereinafter, referred to as a HSM) method, which is defined in advance, when the walking pattern satisfying the ZMP equation is generated.

The comparing unit 54 compares the walking pattern similarity, calculated by the walking pattern similarity calculating unit 52, with a predetermined reference pattern similarity, and checks whether the walking pattern similarity is larger than the reference pattern similarity. The comparing unit 54 serves to obtain a walking pattern having the maximum HSM satisfying the ZMP equation. The more the target walking pattern of the robot 10 is similar to the typical walking pattern of a human which was investigated in advance, the more the HSM value is increased. Here, the more walking pattern of the robot 10 is similar to the typical walking pattern of a human being as a reference pattern or a predetermined pattern, the more the HSM value calculated walking pattern similarity is increased. In the above described-comparison operation, HSM values of the walking pattern of the robot 10 are compared with HSM values of the walking pattern of a human being. Therefore, when the walking pattern generated by the walking pattern generating unit 50 is very close (or similar) to the walking pattern of a human being, it is determined that the walking pattern similarity is larger than the reference pattern similarity.

The walking pattern changing unit 56 adjusts an angle of a knee to maximize the HSM, and generates a new walking pattern in a range to minimize the movement of a waist, in case that the walking pattern similarity is not larger than the reference pattern similarity, as a result of the comparison by the comparing unit 54. The walking pattern changing unit 56 includes a first walking pattern changing unit 57 to change the walking pattern generated by the walking pattern generating unit 50 into a first walking pattern to maximally stretch the knee, and a second walking pattern changing unit 58 to change the walking pattern generated by the walking pattern generating unit 50 into a second walking pattern to minimize the movement (i.e., the horizontal movement) of the waist. Through the walking pattern changed by the walking pattern changing unit 56, achieving the stabilization control of the robot 10 and obtaining the walking pattern maximally similar to that of a human is possible. The changed walking pattern must satisfy the ZMP equation.

The first walking pattern changing unit 57 changes the walking pattern of the leg 11R or 11L located at a front so as to increase the HSM, calculated by the walking pattern similarity calculating unit 52, in case that the current walking phase of the robot 10 is the DSP. For example, the first walking pattern changing unit 57 gradually increases or decreases the angle of the knee of the leg 11R and 11L located at the front.

Further, the first walking pattern changing unit 57 changes the walking pattern of the swing leg 11R or 11L or the supporting leg 11R or 11L so as to increase the HSM, calculated by the walking pattern similarity calculating unit 52, in case that the current walking phase of the robot 10 is the SSP. For example, the first walking pattern changing unit 57 gradually increases or decreases the angle of the knee of the swing leg 11R and 11L.

Thereafter, the ZMP is calculated using positions, speeds, and accelerations of the respective joints, and when the ZMP is not located within the stable range, the changed angle of the knee is restored to an original state thereof.

The second walking pattern changing unit 58 calculates a target ZMP, which is located in the support polygon while minimizing a value of |x| to secure stability, and generates a walking pattern satisfying the ZMP equation from the calculated target ZMP, when it is supposed that a point of x=0 in the ZMP equation is the center of x-axis vibration.

The walking control unit 60 drives the actuators 62 of the respective joints 17R and 17L, 18R and 18L, 19R and 19L, and 23 using angle values changed from the walking pattern generated by the walking pattern generating unit 50 or the walking pattern changing unit 56, i.e., position/direction values of both feet 15R and 15L such that the robot 10 can walk according to the given walking pattern, in case that the walking pattern similarity is larger than the reference pattern similarity, as a result of the comparison by the comparing unit 54.

The real time stabilizer 64 changes the given walking pattern in real time such that the robot 10 can stably walk without falling down even when the real ZMP of the robot 10 differs from the target ZMP or external disturbance (unexpected contact or external force) occurs during the walking of the robot 10 according to the given walking pattern.

Hereinafter, an operation and functions of the above robot and a method of controlling walking of the robot will be described.

Figure 5:
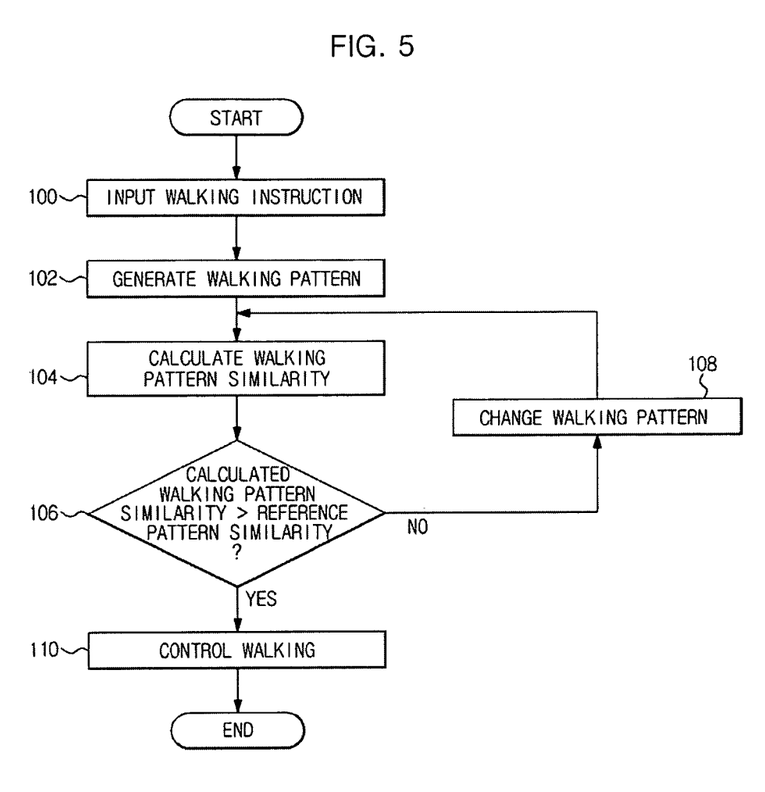
FIG. 5 is a flow chart illustrating a method of controlling walking of a robot in accordance with an embodiment of the present general inventive concept.

FIG. 5 is a flow chart illustrating a method of controlling walking of a robot in accordance with an embodiment of the present general inventive concept.

In FIG. 5, when a walking instruction, such as a target walking speed, a number of steps, or a step width, is given (operation 100), the walking pattern generating unit 50 generates a pattern of the COG satisfying the ZMP equation between the COG and the ZMP to determine target positions and direction of both feet 15R and 15L and generate a walking pattern forming position and direction trajectories of both feet 15R and 15L according to time based on the determined target positions and direction of both feet 15R and 15L.

Through walking control based on ZMP using a principle that the robot 10 does not fall down in case that the ZMP is located in the polygonal surface of the robot 10, a walking pattern satisfying the ZMP equation is generated while controlling the pose of the robot 10 such the ZMP is maintained in the support polygon (operation 102).

When the walking pattern satisfying the ZMP equation is generated, the walking pattern similarity calculating unit 52 calculates a HSM corresponding to the generated walking pattern, as follows (operation 104).

The HSM is used to determine to what extent the walking pattern of the robot 10 is similar to the walking pattern of a human, and is defined such that the more the target walking pattern of the robot 10 is similar to the typical walking pattern of a human which was investigated in advance, the more the HSM value is increased.

The typical human walking pattern is obtained using a three-dimensional motion capture apparatus, and is scaled-up or scaled-down such that the typical human walking pattern has a same size and step width as the walking pattern of the robot 10.

Now, examples of the HSM definition will be described in more detail.

First, the HSM is defined as the reciprocal number of a value, which is obtained by giving a weight to spatial differences of corresponding main points (for example, both ankles, both knees, both hips, a waist, etc.) between the typical human walking pattern, investigated in advance, and the walking pattern of the robot 10 at the corresponding time, squaring the obtained values, and then adding the squares.

$$HSM = \frac{1}{(x - x_h)^T W(x - x_h)} \quad \text{[Expression 2]}$$

Here, W represents a weight, as follows.

$$W = \begin{bmatrix} w_1 & & & \\ & \vdots & & \\ & & \vdots & \\ & & & w_9 \end{bmatrix}$$

Figure 6:
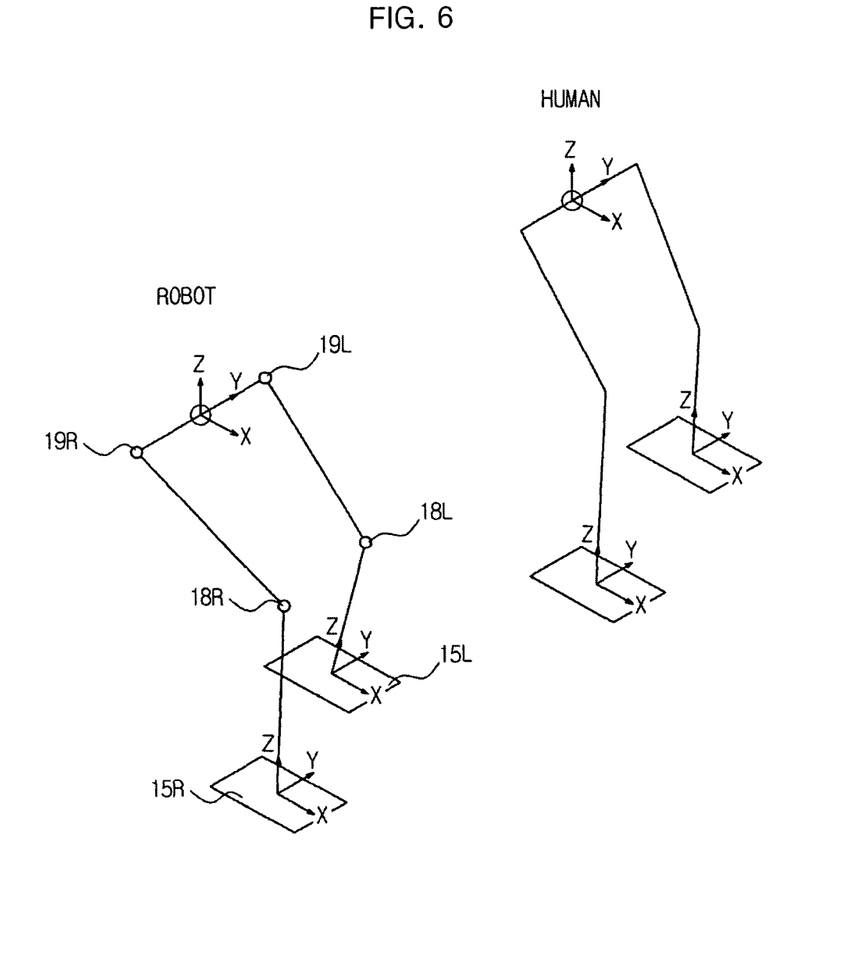
FIG. 6 is a view illustrating a coordinate system to compare the walking pattern of the robot in accordance with an embodiment of the present general inventive concept and the walking pattern of a human with each other.

Human walking pattern $x_h = [x_{h1}\ x_{h2}\ x_{h3}\ x_{h4}\ x_{h5}\ x_{h6}\ x_{h7}\ x_{h8}\ x_{h9}]^T$ Robot walking pattern $x = [x_1\ x_2\ x_3\ x_4\ x_5\ x_6\ x_7\ x_8\ x_9]^T$ In Expression 2, the origin of walking pattern coordinates is set to a {B} coordinate system in coordinate systems to compare the walking patterns of the human and the robot 10 with each other, as illustrated in FIG. 6.

In FIG. 6, a left view illustrates the walking pattern of the robot 10, generated by the walking pattern generating unit 50, in a coordinate system, and a right view illustrates the typical human walking pattern, which was investigated in advance, in a coordinate system.

Second, the HSM is defined as the mean of correlation values of trajectories of main points (for example, both ankles, both knees, both hips, a waist, etc.) on a space between the typical human walking pattern, investigated in advance, and the target walking pattern of the robot 10 from the starting point of time to the corresponding point of time.

$$HSM = \frac{\sum_{i=1}^{9} R_i}{9} \quad \text{[Expression 3]}$$

Here, $$R_i = \frac{E(x_i x_{hi})}{\sigma_x \sigma_x},$$

E(x) is the mean of x, and $\sigma_x$ is the standard deviation of x.

Figure 7:
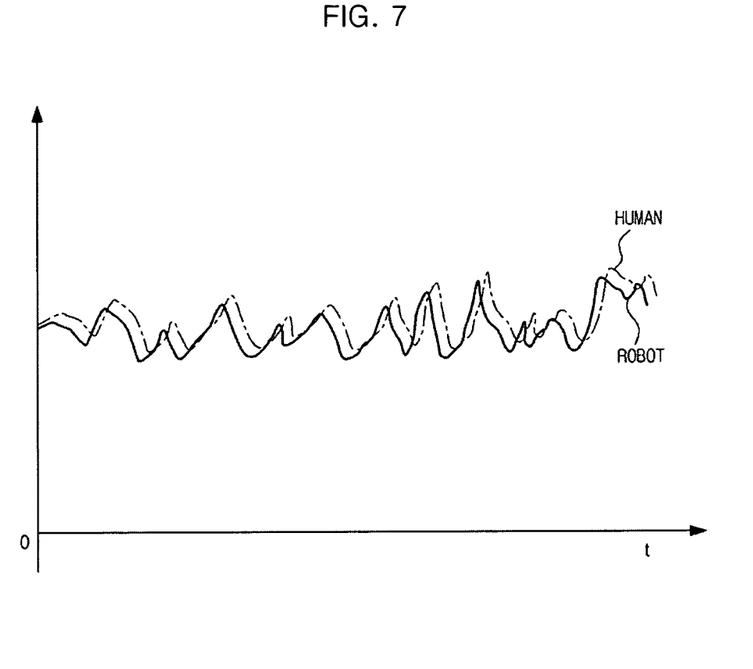
FIG. 7 is a graph comparing a trajectory of the robot in accordance with an embodiment of the present general inventive concept and a trajectory of a human with each other.

FIG. 7 illustrates a graph comparing a trajectory of the robot 10 and a trajectory of a human with each other through expression 3.

The walking pattern similarity to determine to what extent the walking pattern of the robot 10 is similar to the walking pattern of a human is calculated using the above-defined HSM, and thus the walking pattern of the robot 10 is determined.

Thereafter, the comparing unit 54 compares the walking pattern similarity, calculated by the walking pattern similarity calculating unit 52, with the predetermined reference pattern similarity, and checks whether the walking pattern similarity is larger then the reference pattern similarity (operation 106). This comparison is performed so as to obtain a walking pattern having the maximum HSM satisfying the ZMP equation.

The walking pattern changing unit 56 adjusts the angle of a knee to maximize the HSM, and generates a new walking pattern in a range of minimizing the movement of a waist, in case that the walking pattern similarity is not larger then the reference pattern similarity, as a result of the determination of operation 106.

First, the first walking pattern changing unit 57 changes the walking pattern of the leg 11R or 11L located at the front so as to increase the HSM, in case that the current walking phase of the robot 10 is the DSP. For example, the first walking pattern changing unit 57 gradually increases or decreases the angle of the knee of the leg 11R and 11L located at the front, and thus generates a walking pattern to maximally stretch the knee of the leg 11R and 11L.

Further, the first walking pattern changing unit 57 changes the walking pattern of the swing leg 11R or 11L or the supporting leg 11R or 11L so as to increase the HSM, in case that the current walking phase of the robot 10 is the SSP. For example, the first walking pattern changing unit 57 gradually increases or decreases the angle of the knee of the swing leg 11R or 11L, and thus generates a walking pattern to maximally stretch the knee of the swing leg 11R or 11L. Thereafter, the ZMP is calculated using positions, speeds, and accelerations of the respective joints, and when the ZMP is not located within the stable range, the changed angle of the knee is restored to an original state thereof.

Alternatively, the second walking pattern changing unit 58 calculates a target ZMP, which is located in the support polygon while minimizing the value of |x| to secure stability, and generates a second walking pattern satisfying the ZMP equation from the calculated target ZMP, when it is supposed that a point of x=0 in the ZMP equation is the center of x-axis vibration (operation 108). The second walking pattern minimizes the movement (i.e., the horizontal movement) of the waist.

Through the changed walking pattern, achieving the stabilization control of the robot 10 and obtaining the walking pattern maximally similar to that of a human is possible. The changed walking pattern must always satisfy the ZMP equation.

When the walking pattern maximally similar to that of the human is generated through the use of each or combination of the first and second walking pattern changing units 57 and 58, a HSM corresponding to the generated walking pattern is re-calculated again, and then operation 106 is carried out.

Therefore, a determination is made whether the walking pattern is changed or the walking control is performed according to a result of the comparison between the re-calculated walking pattern similarity and the reference pattern similarity.

The walking control unit 60 drives the actuators 62 of the respective joints 17R and 17L, 18R and 18L, 19R and 19L, and 23 using angle values changed from the walking pattern generated by the walking pattern generating unit 50 or the walking pattern changing unit 56, i.e., position/direction values of both feet 15R and 15L, and controls positions/directions of both feet 15R and 15L and the torso 12 such that the robot 10 can walk according to the given walking pattern (operation 110), in case that the walking pattern similarity is larger than the reference pattern similarity, as a result of the comparison of operation 106.

The robot 10 may fall down when the real ZMP of the robot 10 differs from the target ZMP or external disturbance (unexpected contact or external force) occurs during the walking of the robot 10 according to the given walking pattern, as described above. Thus, in order to prevent the robot 10 from falling down, the robot 10 performs a stable walking pattern through real time stabilization control.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As apparent from the above description, the present general inventive concept provides a biped robot and a method of controlling walking of the robot, in which a walking pattern maximally stretching a knee and minimizing a horizontal movement of a waist is generated using a human-like walking similarity measure (HSM) while walking such that the walking pattern of the robot is maximally similar to that of a human, thus enhancing an affinity for a human being and increasing energy efficiency. Thereby, a spread of the biped robot is promoted in a robot and a human coexistence environment.

Although various embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A method of controlling walking of a robot, the method comprising:
generating a walking pattern within a processor configured to control walking of the robot;
calculating a walking pattern similarity of the generated walking pattern with respect to a human walking pattern;
comparing the walking pattern similarity with a predetermined reference pattern similarity, wherein the reference pattern similarity is a reference value to determine to what extent the generated walking pattern is similar to the human walking pattern;
changing, subsequent to the generating, the calculating, and the comparing, the walking pattern of the robot so that a knee of the robot is stretched and a movement of a waist of the robot is minimized when the walking pattern similarity is not larger than the reference pattern similarity; and wherein the changing is performed by driving actuators associated with various joints of the robot according to the changed walking pattern to perform the walking of the robot.

2. The method according to claim 1, wherein in the generation of the walking pattern, the walking pattern satisfying a ZMP equation based on the center of gravity (COG) and a zero moment point (ZMP) of the robot is generated according to a walking instruction.

3. The method according to claim 1, wherein in the change of the walking pattern, the walking pattern is changed so that the walking pattern similarity is increased by adjusting an angle of a knee of the robot, when the walking pattern similarity is not larger than the reference pattern similarity.

4. The method according to claim 3, wherein in the change of the walking pattern, the walking pattern is changed so that the knee is stretched by increasing or decreasing the angle of the knee of a leg located at a front, when the walking phase of the robot is a double support phase (DSP).

5. The method according to claim 3, wherein in the change of the walking pattern, the walking pattern is changed so that the knee is stretched by increasing or decreasing the angle of the knee of a swing leg, when the walking phase of the robot is a single support phase (SSP).

6. The method according to claim 1, wherein in the change of the walking pattern, the walking pattern is changed so that the walking pattern similarity is increased by minimizing a movement of a waist of the robot, when the walking pattern similarity is not larger than the reference pattern similarity.

7. A method of controlling walking of a robot, the method comprising:
generating a walking pattern within a processor configured to control walking of the robot;
calculating a walking pattern similarity of the generated walking pattern with respect to a human walking pattern;
comparing the walking pattern similarity with a predetermined reference pattern similarity, wherein the reference pattern similarity is a reference value to determine to what extent the generated walking pattern is similar to the human walking pattern; and
driving actuators associated with various joints of the robot according to the walking pattern to perform the walking of the robot when the walking pattern similarity is larger than the reference pattern similarity.

8. A robot, comprising:
a walking pattern generating unit configured to generate a walking pattern;
a walking pattern similarity calculating unit configured to calculate a walking pattern similarity of the generated walking pattern with respect to a human walking pattern; and
a control unit configured to compare the walking pattern similarity with a predetermined reference pattern similarity, wherein the reference pattern similarity is a reference value to determine to what extent the generated walking pattern is similar to the human walking pattern, change the walking pattern when the walking pattern similarity is not larger than the reference pattern similarity, and control the walking of the robot according to the changed walking pattern.

9. The robot according to claim 8, wherein the control unit is configured to compare the walking pattern similarity corresponding to the changed walking pattern with the reference pattern similarity, and determine whether the walking pattern is changed or the robot walks according to a result of the comparison.

10. The robot according to claim 8, wherein the control unit is configured to change the walking pattern so that that the walking pattern similarity is increased by adjusting an angle of a knee of the robot.

11. The robot according to claim 10, wherein the control unit is configured to change the walking pattern so that the knee is stretched by increasing or decreasing the angle of the knee of a leg located at the front, in case that the walking phase of the robot is a double support phase (DSP).

12. The robot according to claim 10, wherein control unit is configured to change the walking pattern so that the knee is stretched by increasing or decreasing the angle of the knee of a swing leg, in case that the walking phase of the robot is a single support phase (SSP).

13. The robot according to claim 8, the control unit is configured to change the walking pattern so that that the walking pattern similarity is increased by minimizing a movement of a waist of the robot, in case that the walking pattern similarity is not larger than the reference pattern similarity.

14. A non-transitory computer-readable recording medium having embodied thereon a computer program to execute a method, wherein the method comprises:
generating a walking pattern within a processor configured to control walking of the robot;
calculating a walking pattern similarity of the generated walking pattern with respect to a human walking pattern;
comparing the walking pattern similarity with a predetermined reference pattern similarity, wherein the reference pattern similarity is a reference value to determine to what extent the generated walking pattern is similar to the human walking pattern; and
changing, subsequent to the generating, the calculating and the comparing, the walking pattern of the robot so that a knee of the robot is stretched and a movement of a waist of the robot is minimized when the walking pattern similarity is not larger than the reference pattern similarity,
wherein the changing is performed by driving actuators associated with various joints of the robot according to the generated walking pattern or the changed walking pattern to perform the walking of the robot.

* * * * *